United States Patent
Immel et al.

(10) Patent No.: US 11,707,703 B2
(45) Date of Patent: Jul. 25, 2023

(54) FILTER ELEMENT INTEGRATED SEAL PROFILE

(71) Applicant: Caterpillar Inc., Peoria, IL (US)

(72) Inventors: Jon T. Immel, Chillicothe, IL (US); Stephen Ellis Oedewaldt, Mapleton, IL (US); Jeffrey R. Ries, Metamora, IL (US); Gregory Owen Potts, Washington, IL (US); Jay Hamilton Cline, Peoria, IL (US); Joseph J. Every, Peoria, IL (US); Darrell Lee Morehouse, III, Bedford, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/859,137

(22) Filed: Apr. 27, 2020

(65) Prior Publication Data

US 2021/0331097 A1    Oct. 28, 2021

(51) Int. Cl.
*B01D 29/15*    (2006.01)
*F16J 15/10*    (2006.01)

(52) U.S. Cl.
CPC ............ *B01D 29/15* (2013.01); *F16J 15/104* (2013.01); *B01D 2201/291* (2013.01); *B01D 2201/342* (2013.01); *B01D 2201/347* (2013.01)

(58) Field of Classification Search
CPC .............. B01D 29/15; B01D 2201/291; B01D 2201/342; B01D 2201/347; B01D 2201/0415; B01D 2201/295; B01D 29/21; B01D 35/30; B01D 2201/31; B01D 2201/301; B01D 2201/304; B01D 2201/34; B01D 35/306; F16J 15/104; F02M 25/0854; F02M 37/24; F02M 37/32

USPC .............. 210/437, 450, 493.2, 457, 440–444
See application file for complete search history.

(56) References Cited

U.S. PATENT DOCUMENTS

| | | |
|---|---|---|
| 5,928,511 A | 7/1999 | Messner et al. |
| 7,897,046 B2 | 3/2011 | Fick |
| 8,480,892 B2 | 7/2013 | Jainek et al. |
| 8,501,002 B2 | 8/2013 | Knickmann et al. |
| 9,970,394 B2 | 5/2018 | Merritt et al. |
| 10,343,092 B2 | 7/2019 | Jainek |
| 2002/0030007 A1 | 3/2002 | Koh |
| 2010/0019455 A1* | 1/2010 | Kent, Jr. ................ F16J 15/127 277/312 |
| 2010/0170842 A1* | 7/2010 | Knickmann ........... B01D 29/21 210/236 |
| 2011/0132828 A1* | 6/2011 | Ries ....................... B01D 27/08 210/232 |
| 2012/0080372 A1 | 4/2012 | Ries et al. |
| 2016/0214038 A1 | 7/2016 | Morris et al. |

FOREIGN PATENT DOCUMENTS

DE        3538589 C2    12/1987

\* cited by examiner

*Primary Examiner* — Madeline Gonzalez
(74) *Attorney, Agent, or Firm* — Finnegan, Henderson, Farabow, Garrett & Dunner, LLP (57) ABSTRACT

An integrated seal member includes an at least partially annular body defining a longitudinal axis, a radial direction, and a circumferential direction. The at least partially annular body includes a mounting portion, a sealing portion including at least one top sealing feature and at least one bottom sealing feature, and an apertured connecting portion that extends radially outwardly from the mounting portion to the sealing portion.

12 Claims, 7 Drawing Sheets

FILTER ELEMENT INTEGRATED SEAL PROFILE

TECHNICAL FIELD

The present disclosure relates generally to canister style filter systems that employ a replaceable filter element having an axially intermediate radially outer seal member (e.g. an O-ring) interposed between the base and the canister of the filter system. More specifically, the present disclosure relates to a filter element for use with such filter systems that replaces such a separate seal with a seal member that is integrated with the filter element.

BACKGROUND

Liquid filter systems are known for filtering various fluids such as gas, oil, diesel fuel, etc. to remove contaminants from these fluids. In diesel engines, for example, a fuel line filter is used to separate out water and debris from the fuel. Various seals are provided to prevent leaks. For example in canister style filter systems, there is often a top seal that is disposed between the filter element and the base, a bottom seal that is disposed between the filter element and the canister (may also be referred to as a housing), and an axially intermediate radially outer seal such as a O-ring that is interposed between the base and the canister. It has been determined that sometimes a small amount of leakage may occur when such an O-ring is employed.

U.S. Pat. No. 9,970,394 B2 discloses a locating structure for radially positioning an axial sealing gasket relative to a mounting flange and a sealing flange of the housing and base. The gasket may be axially secured to the mounting flange or sealing flange of the housing and base. Wing nuts are used to secure the housing to the base and provide the necessary sealing force. However, this sealing gasket may still leak similar to an O-ring.

SUMMARY OF THE DISCLOSURE

A filter element according to an embodiment of the present disclosure includes at least a partially annular configuration and that defines a longitudinal axis, a radial direction, and a circumferential direction. The filter element may comprise an annular filter media defining a central passage, a center tube that is disposed in the central passage of the annular filter media that defines a central reservoir, and the annular filter media surrounds the center tube and the central reservoir. A top open end may be joined to the center tube disposed along the longitudinal axis, the top open end including an opening allowing fluid to flow from the central reservoir to the outside of the filter element. A bottom end (may be open or closed) may be joined to the center tube opposite the top open end disposed along the longitudinal axis. An integrated seal member may be attached to the filter element and may include a sealing portion that is disposed radially away from the annular filter media, and axially between the top open end and the bottom open end.

An integrated seal member according to an embodiment of the present disclosure may comprise an at least partially annular body defining a longitudinal axis, a radial direction, and a circumferential direction. The at least partially annular body may include a mounting portion, a sealing portion including at least one top sealing feature and at least one bottom sealing feature, and a connecting portion that extends radially outwardly from the mounting portion to the sealing portion.

A canister filter system according to an embodiment of the present disclosure may comprise a filter element that includes at least partially a cylindrical configuration and that defines a longitudinal axis, and a radial direction. The filter element may comprise an annular filter media defining a central passage, a center tube that is disposed in the central passage of the annular filter media that defines a central reservoir, and the annular filter media surrounds the center tube and the central reservoir. A top open end may be joined to the center tube disposed along the longitudinal axis, the top open end including an opening allowing fluid to flow from the central reservoir to the outside of the filter element, and a bottom open end joined to the center tube opposite the top open end disposed along the longitudinal axis. A canister may also be provided that includes a top open end, and a bottom open end or a bottom closed end disposed along the longitudinal axis, and a sealing flange disposed proximate to the top open end. A base may also be provided that defines a top open end, a bottom open end, an at least partially downwardly facing sealing groove disposed proximate the bottom open end. An integrated seal member may be attached to the filter element and that includes a sealing portion that is disposed in the sealing groove of the base and that contacts the sealing flange of the canister.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

First, a filter system will now be described to give the reader the proper context for understanding how various embodiments of the present disclosure are used. It is to be understood that this description is given as exemplary and not in any limiting sense. Any embodiment of an apparatus or method described herein may be used in conjunction with any filter system.

Then, a filter element that may include an integrated seal member according to various embodiments will be discussed. In some embodiments, the integrated seal member may ease assembly of a filter system while also providing sealing redundancy to help prevent leaks, while at the same time allowing dirty fluid to flow through the apertures of the connecting portion of the integrated seal member so that the dirty fluid may reach the annular filter media in order to be filtered. Also, an integrated seal member that may be provided as a replacement part or as a component to manufacture a filter element will then be discussed.

Figure 1:
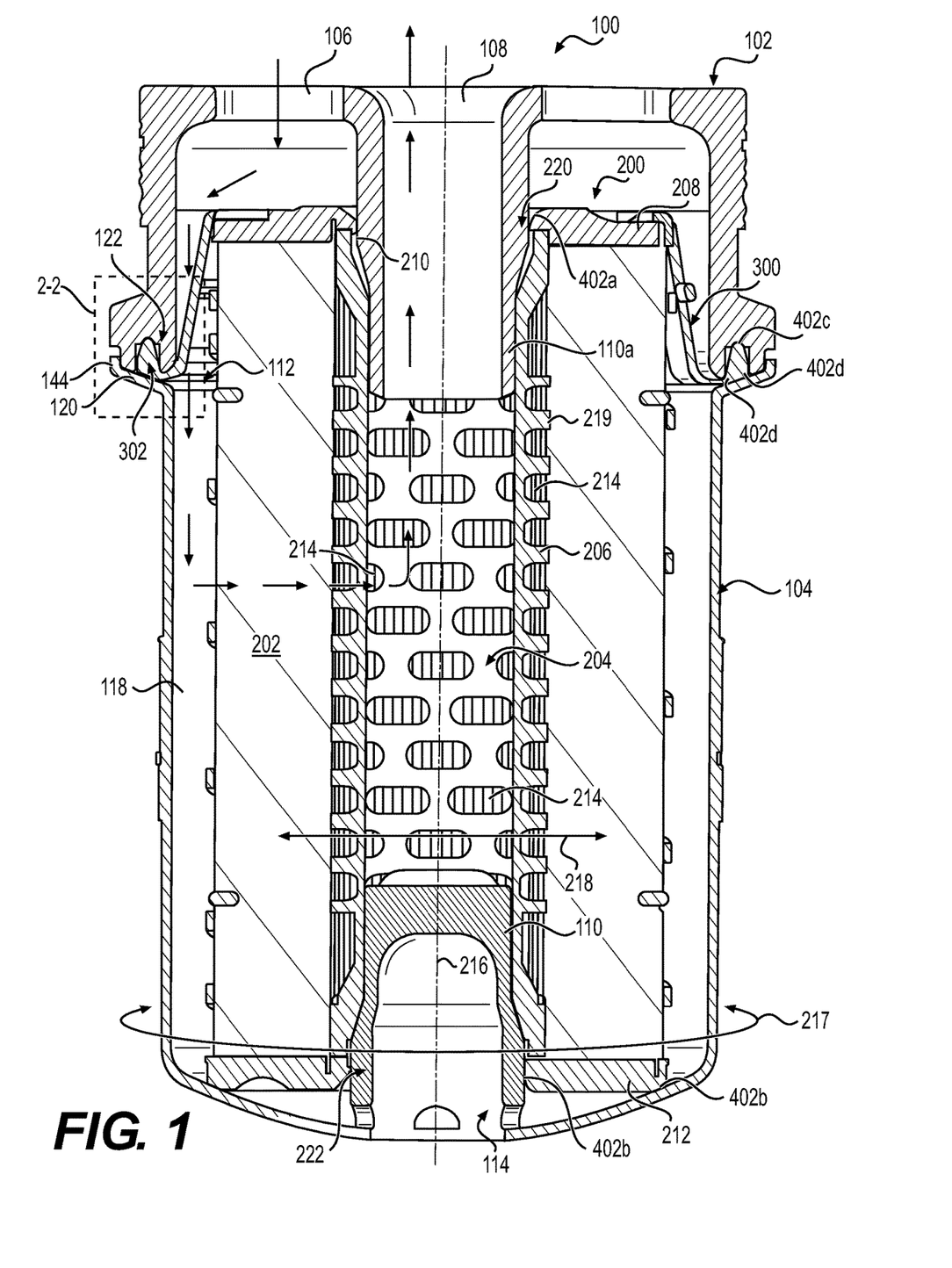
FIG. 1 is a front sectional view of a filter assembly that includes a filter base, a canister, and a filter element including an integrated seal member according to an embodiment of the present disclosure.

FIG. 1 illustrates a canister filter system 100 that may use a filter element 200, and an integrated seal member 300 according to various embodiments of the present disclosure.

The canister filter system 100 may include having a base 102, a canister 104, and a filter element 200 with an integrated seal member 300. The canister filter system 100 may be used to filter fluids such as diesel or gasoline or other liquid fuels, lubrication oil, hydraulic fluid for hydraulic power systems, transmission fluid, or even possibly intake air for an engine. The canister filter system 100 may also be used as a fuel/water separator filter. The canister filter system 100 with the features described herein could be adapted by those of ordinary skill in this art to serve many different purposes and suit many other applications.

The base 102 includes an inlet channel 106 for fluid to enter into the canister filter system 100, and an outlet channel 108 for fluid to exit from the canister filter system 100. A clip (not shown) may be provided to attach the canister 104 to the base 102. Other attachment structure such as threads, various fasteners, etc. may be used.

The canister 104 includes a top open end 112 and a bottom open end 114 as shown in FIG. 1 or a bottom closed end in other embodiments of the present disclosure.

The filter element 200 may take many different forms to suit a particular application. In the illustrated embodiment, the filter element 200 is well suited for filtering fuel or lubrication oil. The filter element 200 may include annular filter media 202 circumferentially surrounding a central reservoir 204 defined by a center tube 206. Axial ends of annular filter media 202 are shown to be sealed by top end cap 208, and bottom end cap 212.

A top end cap 208 may define an axial open end of filter element 200. The top end cap 208 is termed "open" because it includes an opening 210 for allowing passage of fluid.

On the other hand, the bottom end cap 212 defines an axial open end of filter element 200. The bottom end cap 212 is termed "open" because it allows the insertion of a pedestal 110 into center tube 206, etc.

The top end cap 208 and the bottom end cap 212 may each be joined to the center tube 206 via welding, adhesives, molding onto the center tube, etc. Alternatively, several or all of center tube 206, the top end cap 208, and the bottom end cap 212 may be constructed as unitary components. Conversely, the bottom end cap 212 and/or the top end cap 208 may be separate components from the center tube 206, etc. Further details of the closed configuration of the bottom of the canister filter system 100 and the filter element 200 will be discussed later herein.

In operation, fluid to be filtered enters from the inlet channel 106 and flows to the annular cavity 118 between canister 104 and the annular filter media 202. The fluid then passes into and through filter media 202, then into the center tube 206 through the perforations 214 shown therein in FIG. 1.

Then, the fluid exits center tube 206 through the top end cap 208 and opening 210 into the outlet channel 108. The sealed construction at the top and bottom of the filter element 200 helps to define the fluid channels into and out of the annular filter media 202, preventing any fluid from flowing directly to outlet channel 108 and bypassing the annular filter media 202. To that end, sealing features (such as round, pointed, flat, etc.) may be provided that will be discussed in detail later herein. Moreover, it may be desirable to create a chamber (e.g. a water bowl in fuel-water separators, a drain reservoir, etc.) between the bottom of the filter element and the bottom of the canister. So, a positioning feature may be provided by the pedestal. Other configurations of the filter element 200 are possible in other embodiments of the present disclosure.

Figure 2:
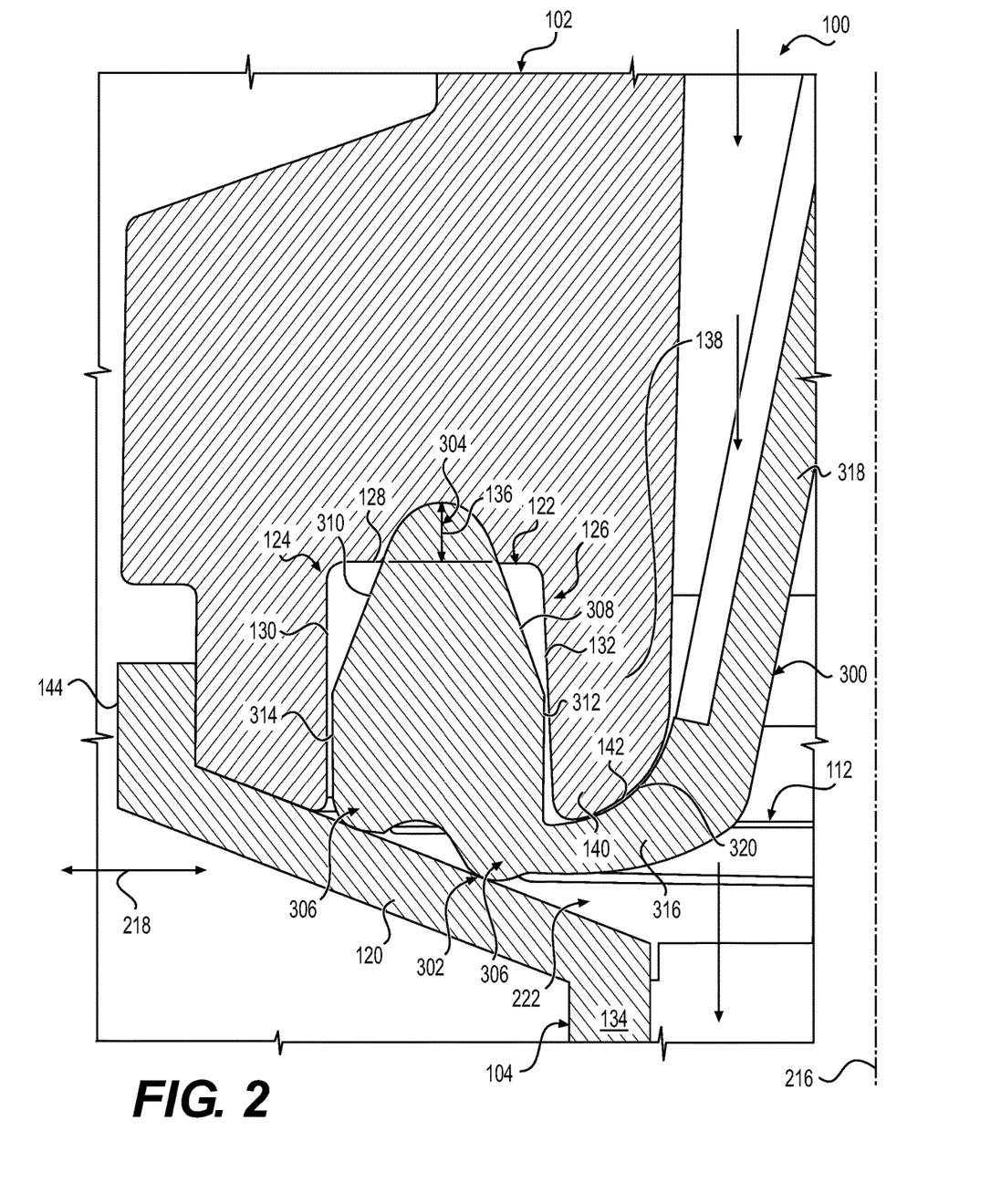
FIG. 2 is an enlarged detail view of the sealing portion of the integrated seal of FIG. 2 taken from rectangle 2-2 thereof, showing the sealing portion forming a top sealing interface with the base and a bottom sealing interface with the canister.

Referring now to FIGS. 1 and 2, a canister filter system 100 according to various embodiments of the present disclosure that includes an integrated seal member 300 will now be discussed.

Starting with FIG. 1, the canister filter system 100 may comprise a filter element 200 that includes at least partially a cylindrical configuration (or annular configuration, thus various surfaces of the filter element and the integrated seal member may be surfaces of revolution that are consistent in the circumferential direction) and that defines a longitudinal axis 216, a circumferential direction 217, and a radial direction 218. The filter element 200 may comprise an annular filter media 202 defining a central passage 219 and a center tube 206 that is disposed in the central passage 219 of the annular filter media 220 that defines a central reservoir 204. Thus, the annular filter media 202 surrounds the center tube 206, and the central reservoir 204.

As best seen in FIG. 1, the filter element 200 may further include a top open end 220 joined to the center tube 206 disposed along the longitudinal axis 216. The top open end 220 includes an opening 210 that allows fluid to flow from the central reservoir 204 to the outside of the filter element 200 (may also allow insertion of a top pedestal 110a).

Similarly, the filter element 200 may include a bottom open end 222 joined to the center tube 206 opposite the top open end 220 that is also disposed along the longitudinal axis 216. Thus, the bottom open end 222 allows insertion of the bottom pedestal 110.

The canister filter system 100 may also include a canister 104 that includes a top open end 112, and a bottom open end 114 relative to the longitudinal axis 216, and a bottom pedestal 110 that rests on the bottom open end 114 of the canister 104. This may not be the case in other embodiments of the present disclosure such as in FIG. 1 wherein the pedestal 110 is molded integral with the canister 104.

With reference to FIGS. 1 and 2, it can be seen that the canister 104 includes a sealing flange 120 that is disposed proximate to the top open end 112 of the canister 104 (may also be referred to as a housing), while the base 102 includes a downwardly facing sealing groove 122 (may also be referred to as a seal receiving groove) that is disposed proximate to the bottom open end 114 of the base 102. The integrated seal member 300 may be attached to the filter element 200, and may include a sealing portion 302 that is disposed in the sealing groove 122 of the base 102, and that contacts the sealing flange 120 of the canister 104.

As best seen in FIG. 2, the sealing groove 122 of the base 102 includes at least partially a rectangular profile 124 or at least partially a trapezoidal profile 126 in a plane containing the radial direction 218, and the longitudinal axis 216 (i.e. the sectioned plane of FIG. 2). More specifically, the at least partially rectangular profile 124 may be defined by a top annular surface 128 that is perpendicular to the longitudinal axis 216, and a radially outer cylindrical surface 130 that extends from the top annular surface 120. On the other hand, the at least partially trapezoidal profile 126 may be defined by the top annular surface 128 that is perpendicular to the longitudinal axis 216, and a radially inner angled surface 132 (angled relative to the longitudinal axis 216 in the plane about 5° to provide a lead-in during assembly, may be referred to as conical) that extends from the top annular surface 128.

In FIG. 2, it can also be seen that the sealing flange 120 of the canister 104 may extend axially upwardly and radially outwardly from the cylindrical wall 134 of the canister 104 (e.g. at about a 20° angle relative to the radial direction in the plane of FIG. 2). This may not be the case for other embodiments of the present disclosure. That is to say, the canister may be otherwise configured.

Looking back at FIG. 1, it can be understood that the sealing portion 302 may be disposed radially outwardly from the annular filter media 202 and axially below the top open end 220 of the filter element 200. This may not be the case for other embodiments. For example, the sealing portion may be positioned axially even with the top open end, etc.

As best seen in FIG. 2, the sealing portion 302 may include a single top sealing lobe 304 that contacts the top annular surface 128 of the sealing groove 122 of the base 102, and a pair of bottom sealing lobes 306 that contact the sealing flange 120 of the canister 104 (providing sealing redundancy).

Looking at the sealing portion 302 in greater detail, the sealing portion 302 of the integrated seal member 300 may include a radially inner angled surface 308 (may also be referred to as conical) that extends down from the top sealing lobe 304, a radially outer conical surface 310 extending down from the top sealing lobe 304 (both surfaces 308, and 310 may provide a lead-in for assembly), a radially inner cylindrical surface 312 extending down from the radially inner angled surface 308 (may also be referred to as conical), and a radially outer cylindrical surface 314 extending down from radially outer conical surface 310. The radially outer cylindrical surface 314, and the radially inner cylindrical surface 312 are configured to contact the radially outer cylindrical surface 130 of the sealing 122 groove and the radially inner angled surface 132 of the sealing groove 122 respectively (e.g. by bulging in opposite radial directions) when the top sealing lobe 304 is compressed (see arrow 136 for the amount of compression). This arrangement may provide sealing redundancy.

With continued reference to FIG. 2, the base 102 includes a radially inner wall 138 that at least partially defines the sealing groove 122, and that includes a free end 140 defining a bottom convex arcuate blend 142 facing radially inwardly and axially downwardly. Likewise, the integrated seal member 300 includes a bridge portion 316 (bridging from the connecting portion 318 of the integrated seal member 300 to the sealing portion 302) that defines a bridge concave arcuate blend 320 that at least partially matches the bottom convex arcuate blend 142 of the base 102.

The canister 104 may further comprise an outside locating wall 144 that extends axially upwardly from the sealing flange 120, and the base 102 further comprises a radially outer wall 146 that partially defines the sealing groove 122 and that is configured to contact the outside locating wall 144, and the sealing flange 120 of the canister 104 simultaneously. This arrangement may prevent the sealing portion 302 of the integrated seal member 300 from being over compressed.

Figure 3:
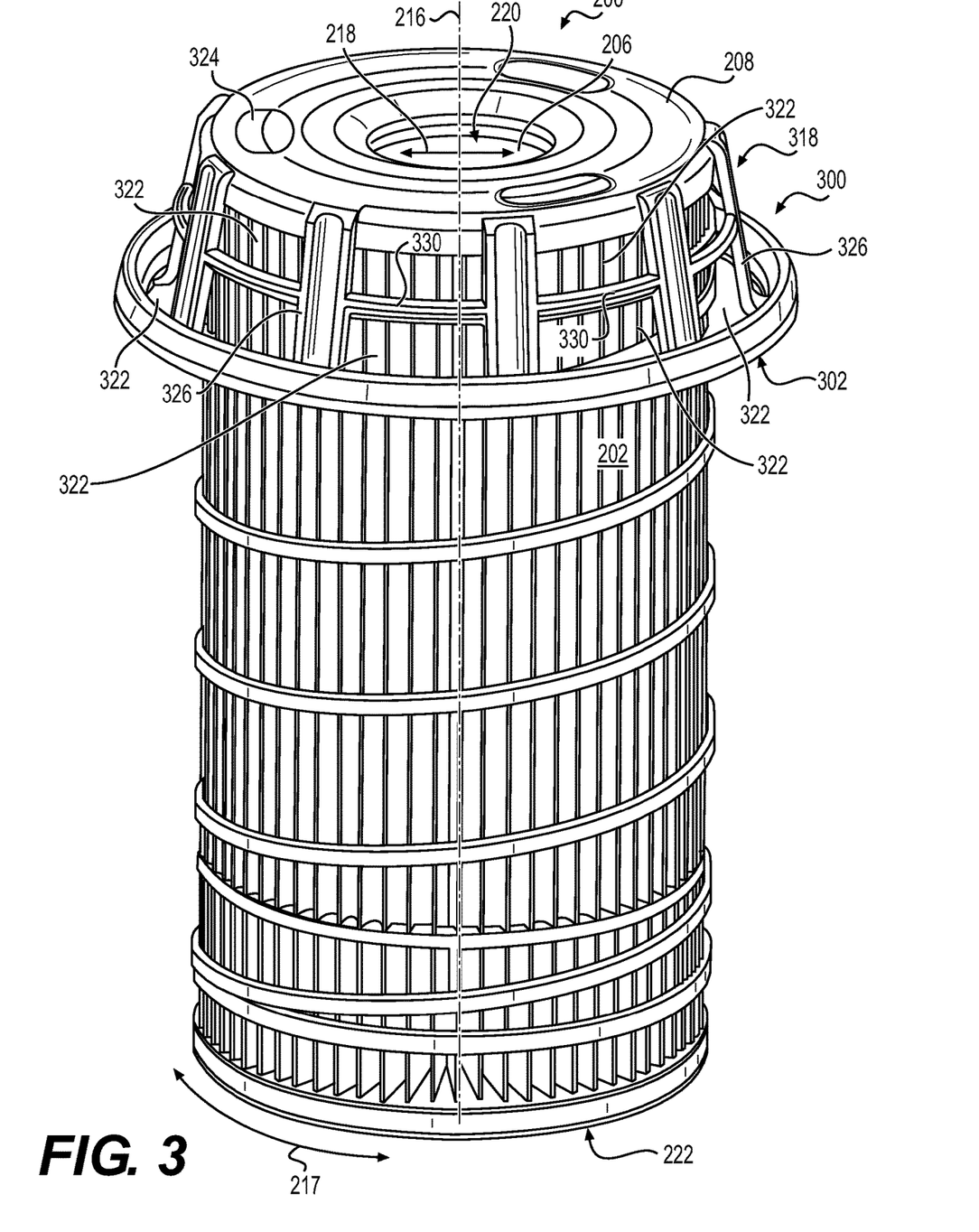
FIG. 3 is a perspective view of the filter element of FIG. 1 including its integrated seal member removed from the filter assembly of FIG. 1.

Next, a filter element 200 that may be supplied as replacement part will now be described with reference to FIGS. 3 and 4.

The filter element 200 may be constructed as previously described herein, and may comprise an integrated seal member 300 that is attached to the filter element 200, and includes a sealing portion 302 that is disposed radially away from the annular filter media 202, and axially between the top open end 220, and the bottom open end 222 of the filter element.

The attachment may be achieved in various ways. For example, the top end cap 208 may be over molded onto the center tube 206 and the integrated seal member 300, or the center tube 206, the top end cap 208, and integrated seal member 300 may be formed as a unitary piece of material, or the integrated seal member 300 may be adhered or welded to the top end cap 208, which could then be adhered or welded to the center tube 206, etc. To facilitate this attachment, the integrated seal member 300 may include a top mounting ring 324 (see also FIG. 5) that is trapped or otherwise held by the top end cap 208 that extends over the top and the sides of the top mounting ring 324. This structure 324 may also act as "stand-off tabs" to offset the media during overmolding an end cap, so the media is encapsulated.

As alluded to earlier herein, the integrated seal member 300 may further comprise a connecting portion 318 that extends radially outwardly and axially downwardly from the top open end 220 of the filter element 200. Also, the connecting portion 318 of the integrated seal member 300 may be apertured (see apertures 322) to allow the flow of dirty fluid past the integrated seal member 300 to the annular filter media 202 for being filtered. To that end, the connecting portion 318 includes a series of downwardly extending angled members 326 (so called since they form an angle with the longitudinal axis 216 of about 15° in the sectioned plane of FIG. 4), and a plurality of cross-members 330 connecting each of the series of downwardly angled members 326 together circumferentially (forming a web-like structure). Other configurations of the web-like structure are possible in other embodiments of the present disclosure. In some embodiments, the cross-members 330 may be omitted.

Figure 4:
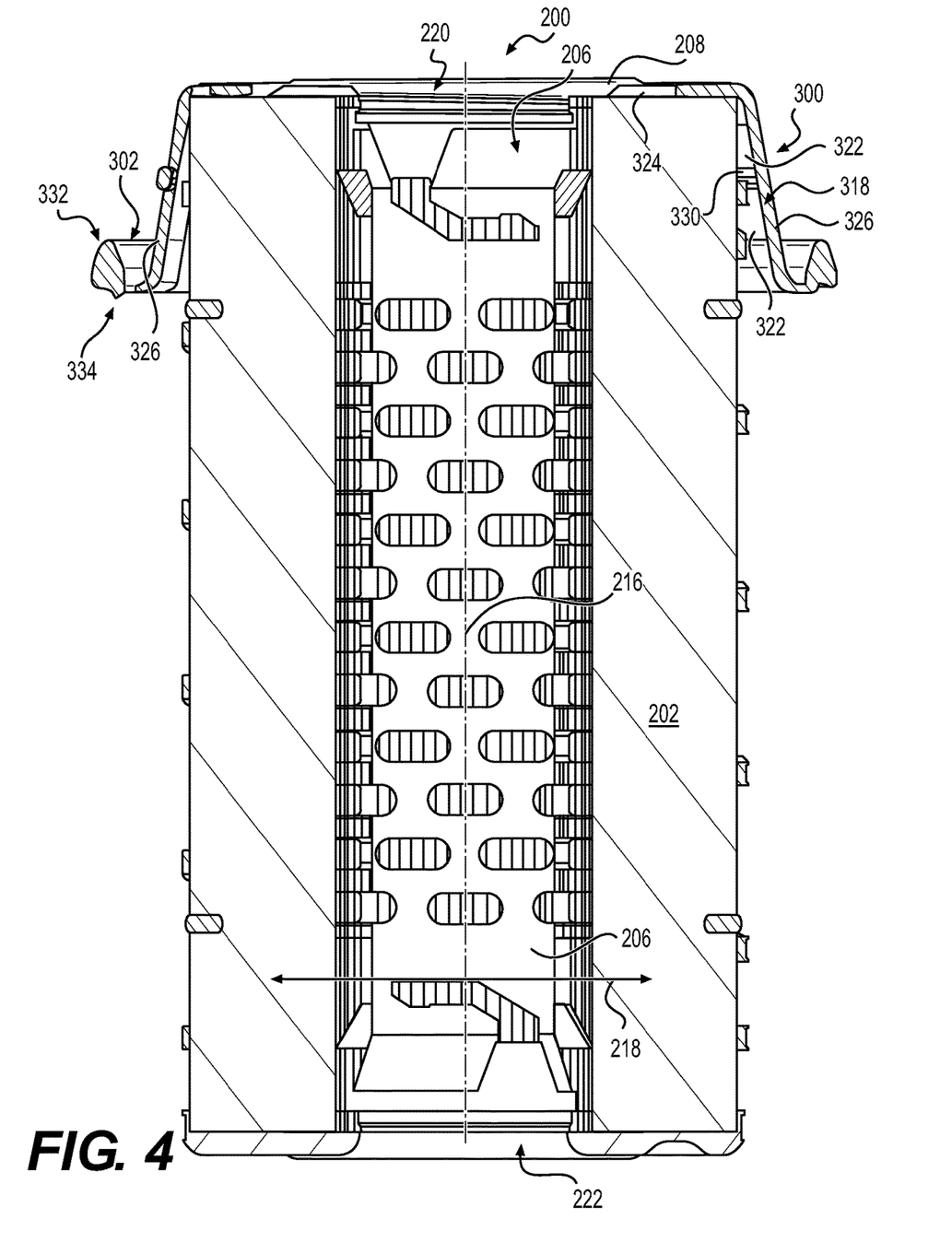
FIG. 4 is a front sectional view of the filter element with its integrated seal member of FIG. 3.

As best seen in FIG. 4, the sealing portion 302 of the integrated seal member 300 may include an upwardly facing arrow portion 332, and an at least partially downwardly facing undulating portion 334 (may also be referred to as a bottom undulating portion). Other configurations of the sealing portion 302 are possible in other embodiments of the present disclosure.

An integrated seal member 300 that may be provided as a replacement part or as a component used to manufacture the filter element 200 just described will now be discussed with reference to FIGS. 5 thru 7.

Figure 5:
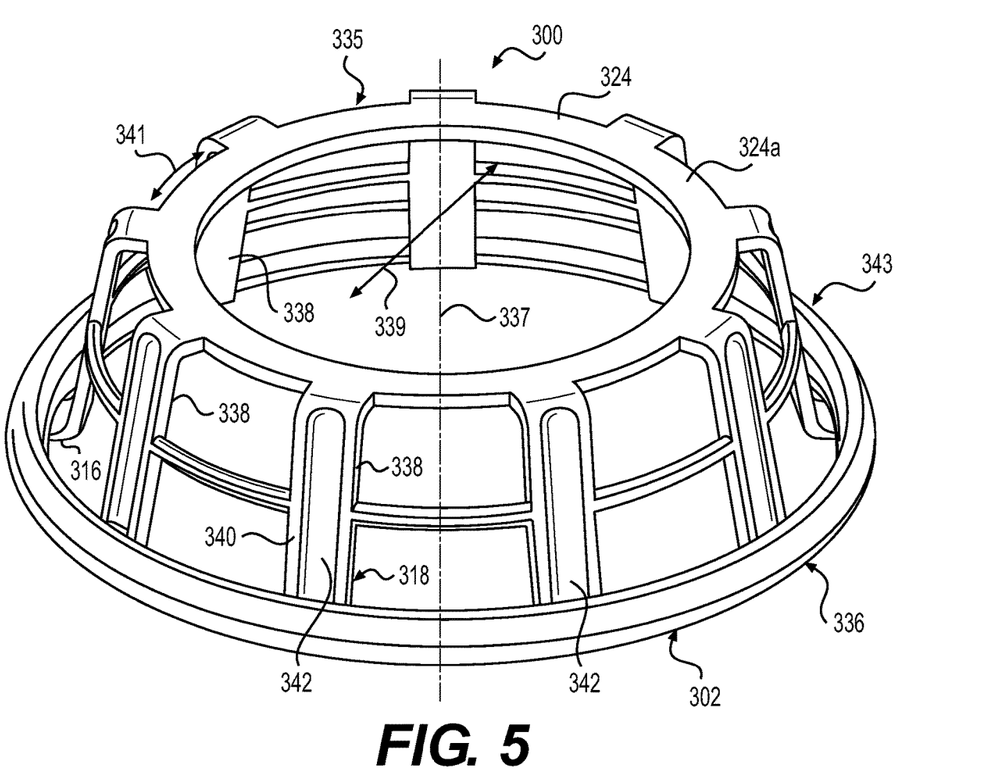
FIG. 5 is a perspective view of the integrated seal member removed from the filter element of FIG. 3.
Figure 6:
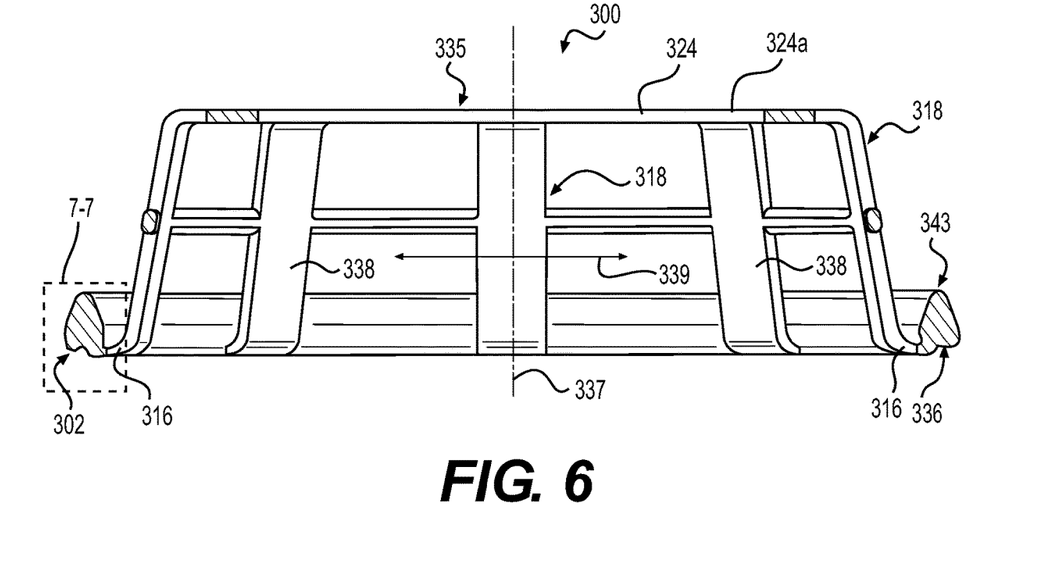
FIG. 6 is a front sectional view of the integrated seal member of FIG. 5.

Looking at FIGS. 5 and 6, the integrated seal member 300 may comprise an at least partially annular body 335 defining a longitudinal axis 337, a radial direction 339, and a circumferential direction 341. The at least partially annular body 3335 may include a mounting portion 324a, a sealing portion 302 including at least one top sealing feature 343 (may have any suitable shape included arcuate, flat, pointed, etc.), and at least one bottom sealing feature 336 (may have any suitable shape included arcuate, flat, pointed, etc.). Also, a connecting portion 318 may extend radially outwardly (e.g. purely radially outwardly, substantially radially outwardly, radially outwardly and axially downwardly, etc.) from the mounting portion 324a to the sealing portion 302.

In some embodiments, the connecting portion 318 also extends axially downwardly from the mounting portion 324a, and defines a grid pattern. The mounting portion 324a may also include a ring (e.g. top mounting ring 324 that is perpendicular to or defines the longitudinal axis 328).

The grid pattern may be formed at least partially by a plurality of members 338 that extend radially outwardly and axially downwardly from the ring 324 to the sealing portion 302. Each of the plurality of members 338 may include a radially outwardly facing surface 340, and a groove 342 may be disposed on the radially outwardly facing surface 340 but not necessarily so.

Figure 7:
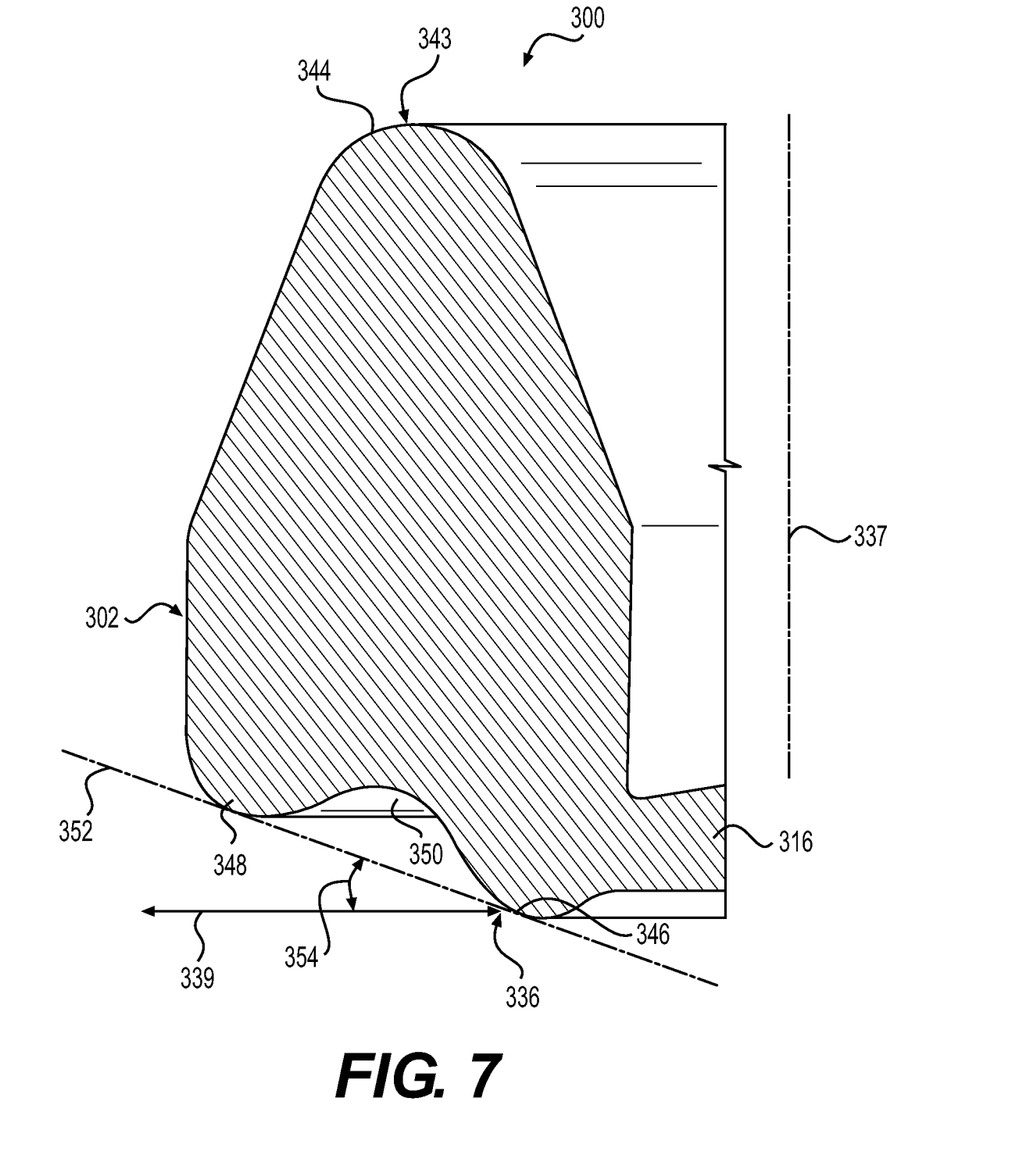
FIG. 7 is an enlarged detail view of the peripheral sealing portion of the integrated seal member of FIG. 6 taken from rectangle 7-7 thereof.

As best seen in FIG. 7, the at least one top sealing feature 334 of the sealing portion 302 may include a top convex arcuate sealing surface 344, and the at least one bottom sealing feature 336 of the sealing portion 302 may include a bottommost convex arcuate sealing surface 346, and a radially outermost convex arcuate sealing surface 348. This surface 348 may be disposed radially outwardly proximate to the bottommost convex arcuate sealing surface 346 with a concave arcuate transitional surface 350 interposed therebetween.

The top convex arcuate sealing surface 344 may be at least partially interposed radially between the radially outermost convex arcuate sealing surface 348, and the bottommost convex arcuate sealing surface 346. The radially outermost convex arcuate sealing surface 348 may be at least partially disposed axially between the top convex arcuate sealing surface 344, and the bottommost convex arcuate sealing surface 346. This arrangement may define a tangent line 352 that is tangent to both the bottommost convex arcuate sealing surface 346, and the radially outermost convex arcuate sealing surface 348, forming an acute angle 354 (may match the angle of the sealing flange of the canister) with the radial direction 330 in a plane containing the radial direction 330, and the longitudinal axis 328 (i.e. the sectioned plane of FIG. 7). This may not be the case in other embodiments of the present disclosure.

The integrated seal member may be constructed using any suitable material and manufacturing process. For example, a material of urethane having a durometer of 20 to 95 Shore A (e.g. 60 Shore A) may be employed that is injection molded into shape.

Any of the aforementioned features, components, or assemblies may be varied in configuration to be different in other embodiments of the present disclosure than what has been specifically shown and described herein.

INDUSTRIAL APPLICABILITY

In practice, a filter element, an integrated seal member, or a canister filter system according to any embodiment disclosed herein may be obtained or provided in an OEM (original equipment manufacturer) or aftermarket context. The various features previously discussed may be used to provide sealing redundancy while also simplifying assembly.

Figure 8:
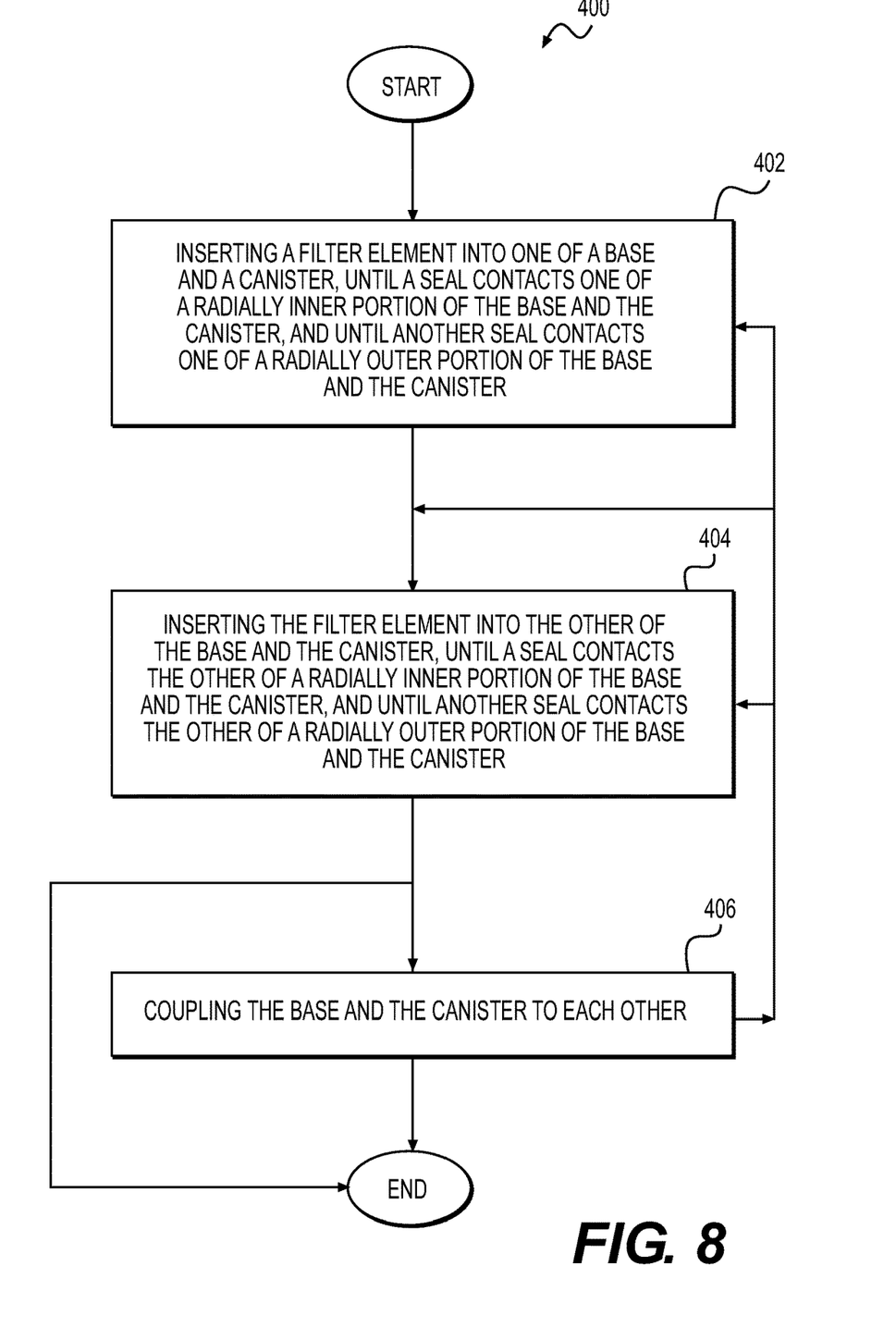
FIG. 8 is a flow chart containing a method of assembly associated with FIGS. 1 and 3.

In light of the foregoing, a method of assembly of a canister filter system according to an embodiment of the present application may be employed as depicted in FIG. 8 that allows assembly with three or fewer steps while also providing sealing redundancy.

The method 400 may comprise inserting a filter element into one of a base and a canister, until a seal contacts one of a radially inner portion of the base and the canister, and until another seal contacts one of a radially outer portion of the base and the canister (step 402). For example, the seal contact at the radially inner portion of the base is shown in FIG. 1 at 402a, while the seal contact at the radially inner portion of the canister is shown in FIG. 1 at 402b. Similarly, the seal contact at the radially outer portion of the base is shown in FIG. 1 at 402c, while the seal contact at the radially outer portion of the canister is shown in FIG. 1 at 402d.

Next, the method may further comprise inserting the filter element into the other of the base and the canister, until a seal contacts the other of a radially inner portion of the base and the canister, and until another seal contacts the other of a radially outer portion of the base and the canister (step 404).

For example, step 402 may involve inserting the filter element into the canister, creating seal contacts 402b and 402d simultaneously or virtually simultaneously as shown in FIG. 1, while step 404 may involve inserting the filter element into the base, creating seal contacts at 402a and 402c, or vice versa. Steps 402 and 404 may be accomplished at the same time or at different times.

The base and canister may be coupled to each other (step 406), via threads, a clip, other fasteners, etc. Step 406 may be accomplished after steps 402 and 404, or during steps 402 and 404, etc.

It is further contemplated that the integrated seal member may be attached to the bottom of the filter element (e.g. at the bottom end cap) and extend along a portion of the bottom wall and/or side wall of the canister, terminating in a sealing portion proximate to the sealing flange of the canister, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filter element that includes at least a partially annular configuration and that defines a longitudinal axis, a radial direction, and a circumferential direction, the filter element comprising:
   an annular filter media defining a central passage;
   a center tube that is disposed in the central passage of the annular filter media that defines a central reservoir, and the annular filter media surrounds the center tube and the central reservoir;
   a top open end of the filter element joined to the center tube disposed along the longitudinal axis, the top open end including an opening allowing fluid to flow from the central reservoir to the outside of the filter element;
   a bottom end of the filter element joined to the center tube opposite the top open end disposed along the longitudinal axis; and
   an integrated seal member that includes a top mounting ring attached to the top open end and a sealing portion that is disposed radially away from the annular filter media, and axially between the top open end and the bottom end, and completely axially below a top portion of the annular filter media, wherein the integrated seal member further comprises a connecting portion that extends radially outwardly and axially downwardly from the mounting ring, wherein the connecting portion of the integrated seal member is apertured, and wherein the connecting portion includes a series of downwardly extending angled members, the series of downwardly extending angled members is at least partially apertured.

2. The filter element of claim 1 wherein the sealing portion of the integrated seal member includes an upwardly facing arrow portion and an at least partially downwardly facing undulating portion.

3. An integrated seal member comprising:
   an at least partially annular body defining a longitudinal axis, a radial direction, and a circumferential direction, the at least partially annular body including
   a mounting portion;
   a sealing portion including at least one top sealing feature and at least one bottom sealing feature; and
   a connecting portion that extends radially outwardly from the mounting portion to the sealing portion, the connecting portion also extending axially downwardly from the mounting portion;
   wherein the at least one bottom sealing feature of the sealing portion includes a innermost convex arcuate sealing surface, and a radially outermost convex arcuate sealing surface that is disposed radially outwardly proximate to the innermost convex arcuate sealing surface with a concave arcuate transitional surface interposed therebetween.

4. The integrated seal member of claim 3 wherein the connecting portion defines a grid pattern, and the mounting portion includes a ring that is perpendicular to the longitudinal axis.

5. The integrated seal member of claim 4 wherein the connecting portion includes a plurality of members extending radially outwardly and axially downwardly from the ring to the sealing portion, each of the plurality of members including a radially outwardly facing surface and a groove that is disposed on the radially outwardly facing surface.

6. The integrated seal member of claim 5 wherein the at least one top sealing feature of the sealing portion includes a top convex arcuate sealing surface.

7. The integrated seal member of claim 6 wherein the top convex arcuate sealing surface is at least partially interposed radially between the radially outermost convex arcuate sealing surface and the innermost convex arcuate sealing surface, and the radially outermost convex arcuate sealing surface is at least partially disposed axially between the top convex arcuate sealing surface and the innermost convex arcuate sealing surface, defining a tangent line that is tangent to both the innermost convex arcuate sealing surface and the radially outermost convex arcuate sealing surface, forming an acute angle with the radial direction in a plane containing the radial direction and the longitudinal axis.

8. A canister filter system comprising:
   a filter element that includes at least partially a cylindrical configuration and that defines a longitudinal axis, and a radial direction, the filter element comprising:
   an annular filter media defining a central passage;
   a center tube that is disposed in the central passage of the annular filter media that defines a central reservoir, and the annular filter media surrounds the center tube and the central reservoir;
   a top open end joined to the center tube disposed along the longitudinal axis, the top open end including an opening allowing fluid to flow from the central reservoir to the outside of the filter element; and
   a bottom open end joined to the center tube opposite the top open end disposed along the longitudinal axis;
   a canister that includes a top open end, a bottom open end or a bottom closed end disposed along the longitudinal axis, and a sealing flange disposed proximate to the top open end;
   a base defining a top open end, a bottom open end, and an at least downwardly facing sealing groove disposed proximate to the bottom open end; and
   an integrated seal member that is attached to the filter element and that includes a sealing portion that is disposed in the sealing groove of the base and that contacts the sealing flange of the canister, the sealing portion being disposed entirely axially below a top portion of the annular filter media, wherein the sealing groove of the base includes at least partially a rectangular profile or at least partially a trapezoidal profile in a plane containing the radial direction and the longitudinal axis, wherein the at least partially rectangular profile is defined by a top annular surface that is perpendicular to the longitudinal axis and a radially outer cylindrical surface that extends from the top annular surface, wherein the at least partially trapezoidal profile is defined by the top annular surface that is perpendicular to the longitudinal axis and a radially inner angled surface that extends from the top annular surface, and wherein the sealing portion is disposed radially outwardly from the annular filter media and axially below the top open end of the filter element, and the sealing portion includes a single top sealing lobe that contacts the top annular surface of the sealing groove of the base and a pair of bottom sealing lobes that contact the sealing flange of the canister.

9. The canister filter system of claim 8 wherein the sealing flange of the canister extends axially upwardly and radially outwardly from the canister.

10. The canister filter system of claim 8 wherein the sealing portion of the integrated seal member includes a radially inner angled surface extending down from the top sealing lobe, a radially outer conical surface extending down from the top sealing lobe, a radially inner cylindrical surface extending down from the radially inner angled surface, and a radially outer cylindrical surface extending down from radially outer conical surface, and the radially outer cylindrical surface and the radially inner cylindrical surface are configured to contact the radially outer cylindrical surface of the sealing groove and the radially inner angled surface of the sealing groove respectively when the top sealing lobe is compressed.

11. The canister filter system of claim 10 wherein the base includes a radially inner wall that at least partially defines the sealing groove that includes a free end defining a bottom convex arcuate blend facing radially inwardly and axially downwardly, and the integrated seal member includes a bridge portion that defines a bridge concave arcuate blend that at least partially matches the bottom convex arcuate blend of the base.

12. The canister filter system of claim 11 wherein the canister further comprises an outside locating wall that extends axially upwardly from the sealing flange, and the base further comprises a radially outer wall that partially defines the sealing groove and that is configured to contact the outside locating wall and the sealing flange of the canister simultaneously.

\* \* \* \* \*